United States Patent
Barbulescu et al.

(10) Patent No.: US 9,531,921 B2
(45) Date of Patent: Dec. 27, 2016

(54) SYSTEM AND METHOD FOR VIDEO AND SECONDARY AUDIO SOURCE SYNCHRONIZATION

(71) Applicant: ALPINE AUDIO NOW DIGITAL, LLC, Reston, VA (US)

(72) Inventors: Marcel Barbulescu, Falls Church, VA (US); Elan Joel Blutinger, Washington, DC (US); Eugen Leontie, Fort Washington, MD (US); Jeffrey N. Pollack, Los Angeles, CA (US); Alexandra Moe, Washington, DC (US)

(73) Assignee: AudioNow IP Holdings, LLC, Wilmington, DE (US)

( * ) Notice: Subject to any disclaimer, the term of this patent is extended or adjusted under 35 U.S.C. 154(b) by 0 days.

(21) Appl. No.: 14/473,254

(22) Filed: Aug. 29, 2014

(65) Prior Publication Data
US 2015/0062429 A1    Mar. 5, 2015

Related U.S. Application Data

(60) Provisional application No. 61/872,141, filed on Aug. 30, 2013.

(51) Int. Cl.
*H04N 5/04*      (2006.01)
*H04N 21/43*     (2011.01)
*H04N 21/81*     (2011.01)
*H04N 21/41*     (2011.01)

(52) U.S. Cl.
CPC ............ *H04N 5/04* (2013.01); *H04N 21/4307* (2013.01); *H04N 21/8106* (2013.01); *H04N 21/4122* (2013.01)

(58) Field of Classification Search
USPC .......................... 348/515, 500, 512
See application file for complete search history.

(56) References Cited

U.S. PATENT DOCUMENTS

| | | | |
|---|---|---|---|
| 7,412,533 B1* | 8/2008 | Johnson | H04L 12/1827 348/E7.083 |
| 8,838,787 B2* | 9/2014 | Gelter | H04N 21/64738 709/224 |
| 9,088,818 B2* | 7/2015 | Hutchings | H04N 21/42607 |
| 2006/0083163 A1* | 4/2006 | Rosen | G10L 21/04 370/229 |
| 2008/0259966 A1* | 10/2008 | Baird | H04J 3/0632 370/503 |

(Continued)

*Primary Examiner* — Paulos M Natnael

(57) ABSTRACT

Disclosed herein are systems, methods, and computer-readable storage media for video and secondary audio source synchronization. A system practicing the method establishes a communication with a device such as a telephone or digital device and receives an identification of an audio stream associated with a video presentation specified by a user. The user interacts with the system using the dial pad on a telephone or by manipulating controls within a dedicated application on a smartphone or tablet device. The system computes a likely delay affecting most devices receiving the audio stream and delays a transmission of the audio stream to the device by the delay amount. In one embodiment, the system receives a delay adjustment signal from the device and adjusts the delay amount according to the signal. Then the system transmits the audio stream to the device by the new delay amount.

15 Claims, 5 Drawing Sheets

(56) References Cited

U.S. PATENT DOCUMENTS

| | | | | |
|---|---|---|---|---|
| 2009/0180755 A1* | 7/2009 | Kanemaru | ............... | H04N 5/04 386/248 |
| 2011/0228768 A1* | 9/2011 | Gelter | ..................... | H04L 49/90 370/389 |
| 2012/0327300 A1* | 12/2012 | Hutchings | .......... | H04N 21/4307 348/515 |

* cited by examiner

SYSTEM AND METHOD FOR VIDEO AND SECONDARY AUDIO SOURCE SYNCHRONIZATION

PRIORITY

This non-provisional application claims priority of U.S. Provisional Patent Application No. 61/872,141 filed on Aug. 30, 2013, which is herein incorporated by reference in its entirety.

BACKGROUND

1. Technical Field

The present disclosure relates to synchronizing a video stream and a secondary audio stream and more specifically to providing a user an ability to dynamically synchronize the video stream and the secondary audio stream utilizing a phone line and/or a digital device.

2. Introduction

Sports fans can view or listen to live or prerecorded sporting events on televisions, radios, desktop computers, laptops, smartphones, tablets and other digital devices. A television can simultaneously deliver a video stream and an audio stream of a sporting event to a viewer. Fans often view games on televisions in their homes and other places such as sports bars, restaurants, waiting rooms and airports. When a sports fan views a sporting event on a television set in their home or other private setting, such as an office, the fan can hear and watch the game, creating a pleasant viewing experience. In a sports bar or other setting with a lot of background noise, it can be difficult for a fan to hear the audio stream of the sporting event, preventing the fan from completely enjoying the sports game.

A sports fan can view a game broadcast on television while receiving the corresponding audio from a secondary device such as a radio, phone or mobile device. However, the video stream can be considerably delayed, such as 10 seconds or more compared to the secondary audio stream, making an unpleasant viewing experience.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for video and secondary audio source synchronization. A system implementing the method can establish a communication with a device such as a telephone, smartphone or tablet, for example. The system can receive an identification of an audio stream associated with a video presentation from a user. The user can dial a local phone number and interact with the system using the telephone dial pad. Alternately, the user can interact with the system via a dedicated application stored on a smartphone. The system can compute a likely delay that will affect most devices receiving the audio stream to yield a delay amount. The likely delay can be based on previous delays reported by users. Then the system can delay a transmission of the audio stream to the device by the delay amount. The user can receive the delayed audio stream associated with the video presentation via the telephone channel or the device application.

In one embodiment, a system can receive a delay adjustment signal from the device. The signal can originate from any number of sources such as a dial pad on a telephone or a dedicated application stored on a digital device. The system can adjust the delay amount according to the delay adjustment signal to yield a new delay amount. The user can specify the new delay amount using the dial pad or by interacting with the application by inputting text, clicking on the screen and manipulating controls within the application. Then the system can delay the transmission of the audio stream to the device by the new delay amount. The user can receive the delayed audio stream associated with the video presentation via the telephone channel or the device application.

DETAILED DESCRIPTION

A system, method and computer-readable media are disclosed which synchronize a video stream with a secondary audio stream utilizing a telephone and/or a digital device. When a primary audio source associated with a video stream is insufficient or undesirable, as is the case in a crowded and noisy restaurant for example, audio from a secondary device such as a radio, phone or mobile device can be utilized. Instead of a user straining to listen to a sports game displayed on a television across the room at a restaurant, the user can use his smartphone to receive the audio stream. The technical challenge in utilizing a secondary device in conjunction with a primary device that delivers the video stream is that the video stream can be considerably delayed, such as 10 seconds or more compared to the secondary audio stream. The delay depends on several factors such as the television network broadcasting the video, the content delivery network such as a cable provider or satellite, and the end-user video equipment. A delay between the audio stream and the video stream is undesirable, as it creates an unpleasant viewing experience for the user.

Various embodiments of the disclosure are described in detail below. While specific implementations are described, it should be understood that this is done for illustration purposes only. Other components and configurations may be used without parting from the spirit and scope of the disclosure.

The present disclosure addresses the need in the art for synchronizing a video stream with a secondary audio stream utilizing a telephone or digital device when audio delivery via a primary source is not available or is insufficient. A system, method and computer-readable media are disclosed which synchronize a video stream with a secondary audio stream delivered via a device. A brief introductory description of a basic general purpose system or computing device in FIG. 1 which can be employed to practice the concepts is disclosed herein. A more detailed description of video and secondary audio source synchronization will then follow. The disclosure now turns to FIG. 1.

Figure 1:
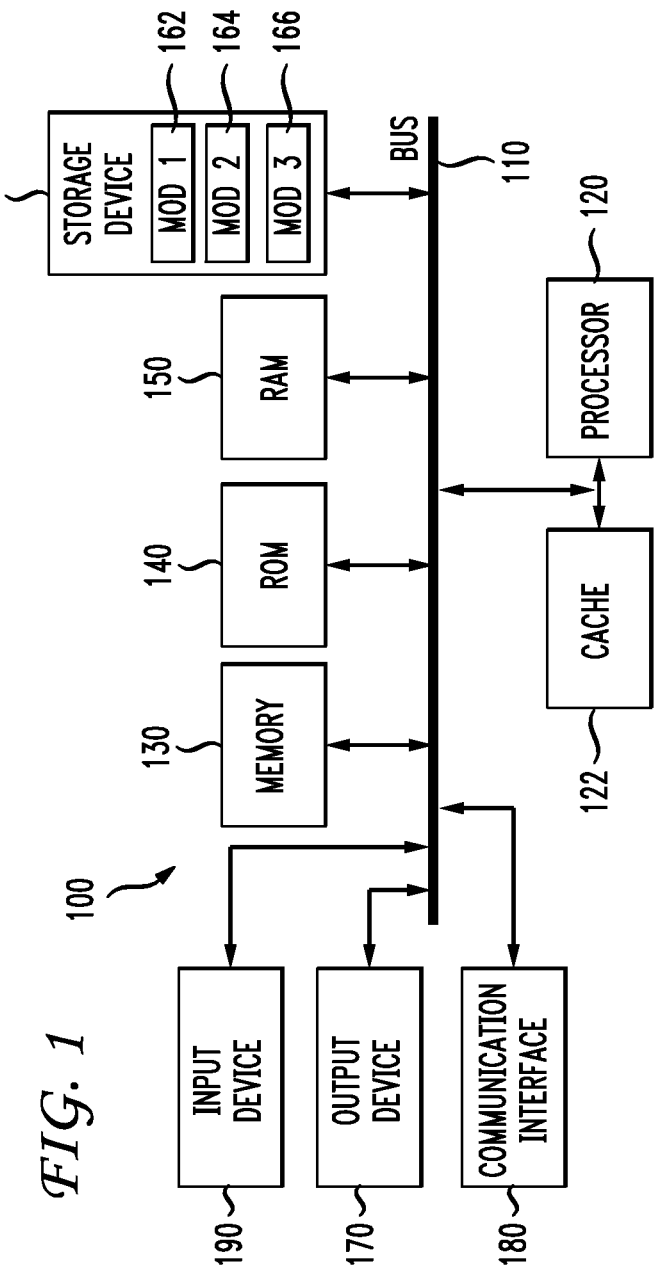
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
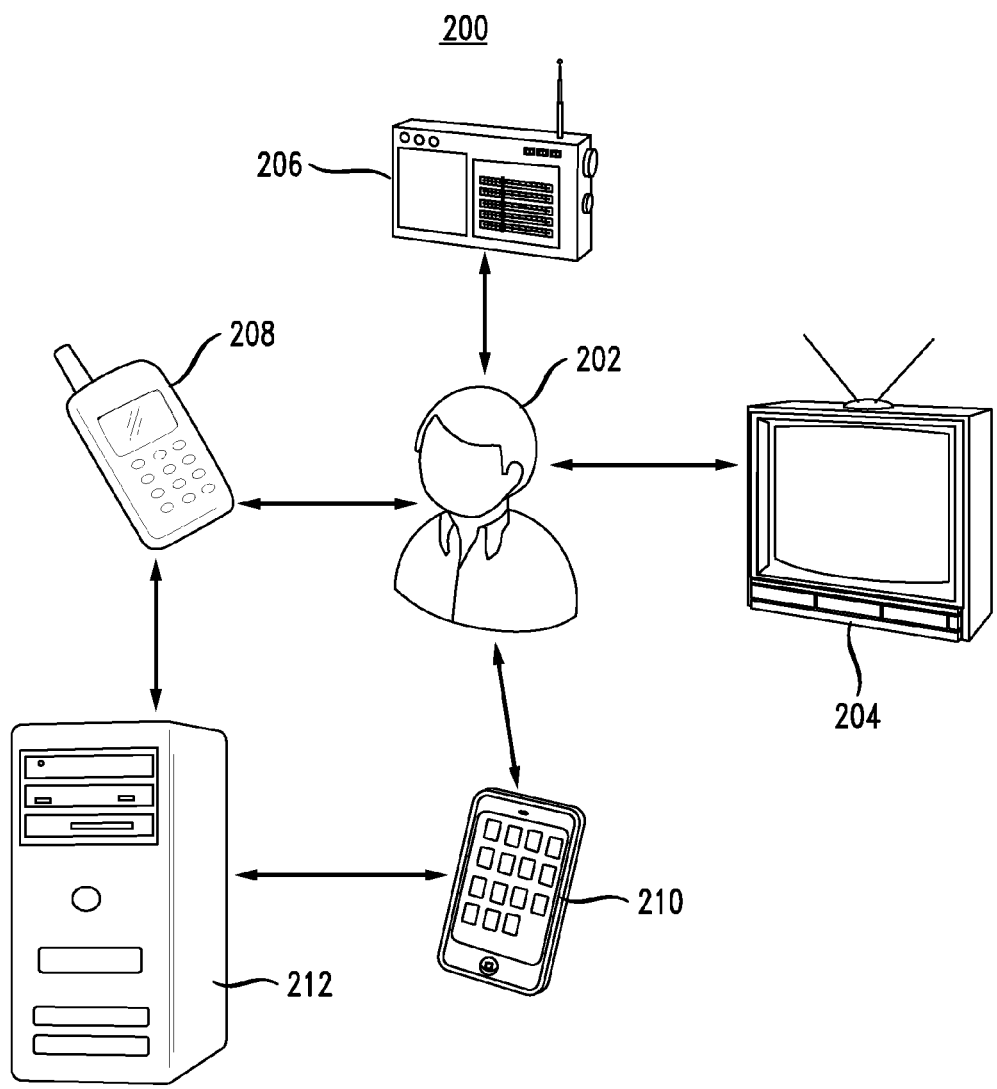
FIG. 2 illustrates an example audio/video synchronization system embodiment.

Having disclosed some components of a computing system, the disclosure now turns to FIG. 2, which illustrates an audio/video synchronization system 200 utilizing a secondary audio source. A user 202 can view a sporting event via a television 204 and can receive the audio from an alternate audio source via a secondary device such as a radio 206, telephone 208 and digital device 210. A server 212 can receive requests for audio streams from telephones 208 and digital devices 210. The user can receive audio from a secondary device and can interact with the system via the same device they are using to listen to the audio, or from a different device. For example, the user can receive audio from a radio associated with a video stream, and can utilize a device such as telephone or digital device to interact with the system or the user can receive audio from a digital device and use the digital device to interact with the system.

The system can synchronize a video stream and an audio stream by first establishing a communication with a device such as a telephone, smartphone or tablet, for example. The system 100 can interact with the user in one of two ways: via a phone line 208 and the digital device 210. To interact with the user via the phone line, the user can dial a local phone number and by using key presses on the phone dial pad, the user can specify preferences. Alternately, the user can interact with the system via a dedicated application stored on a smartphone, for example.

Then the system can receive an identification of an audio stream associated with a video presentation from the user from the user device. The system can compute a likely delay that will affect most users based on the television network the sporting event is broadcast on, and can delay the audio feed with the estimated amount. For example, when an event is broadcast by ESPN, a likely delay of seven seconds is expected for cable customers. The likely delay can be used as a default setting for delaying the audio stream to user devices. The system can delay a transmission of the audio stream to the device by the delay amount. The user can receive the delayed audio stream associated with the video presentation via the telephone channel or the device application, and can enjoy the synchronized video and audio streams.

The user can specify a noticed delay in the audio stream via the device in several different ways such as pressing buttons on a telephone dial pad, entering text, clicking on the screen and dragging controls in the application stored on the device. The device can send a delay adjustment signal to the system based on the delay specified by the user. The system can receive a delay adjustment signal from the device and can adjust the initial or default delay amount according to the new delay amount received from the delay adjustment signal. Then the system can delay the transmission of the audio stream to the device by the new delay amount. For example, the system can initially delay the audio stream for seven seconds based on the likely delay, and the user can dynamically increase or decrease the delay as necessary. The advantage of precomputing an audio delay is that some users may not need to manually adjust the audio delay at all, creating a more pleasant viewing experience.

For example, sports fan John is viewing a soccer game on a television in an airport while waiting for his flight to board. Due to overhead announcements, other passengers in the waiting area and a nearby food court, he cannot hear the audio from the soccer game. John uses a dedicated application on his smartphone to access the corresponding audio stream. Because John is watching the game on ESPN, the system delivers the audio using a precomputed base delay of seven seconds. John can specify his preferences regarding the amount of audio delay using the application on his smartphone by turning a virtual knob until the desired delay is achieved. The actual delay John experiences is five seconds, so he can utilize the virtual knob feature within the application to update the delay. The system can receive the delay adjustment signal from John's smartphone and can adjust the delay amount according to the delay adjustment signal. Then the system can delay the transmission to John's smartphone of the audio stream associated with the soccer game broadcast by ESPN by the new delay amount.

Figure 3:
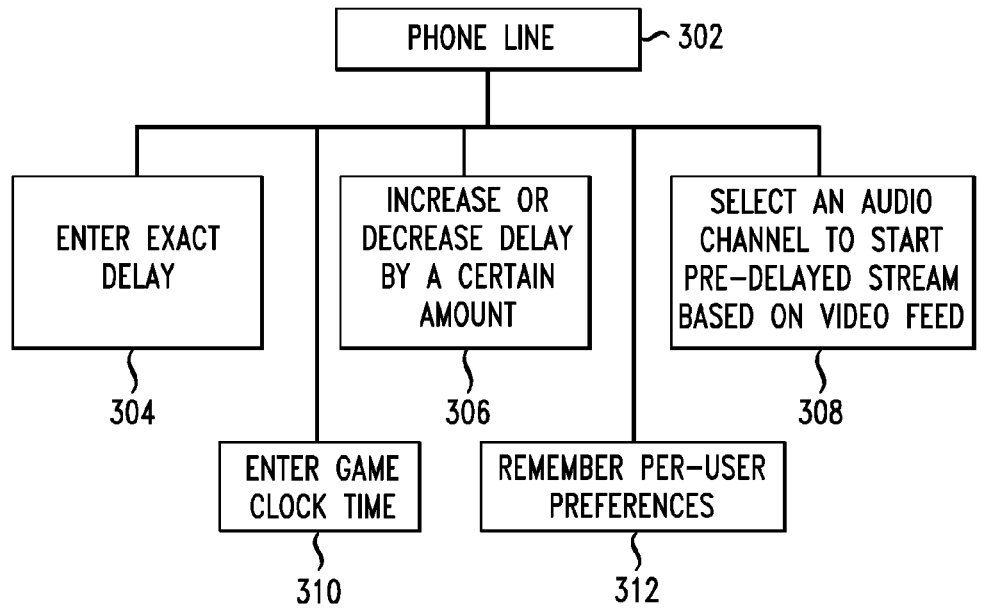
FIG. 3 illustrates an exemplary phone line interface system embodiment.

FIG. 3 illustrates an exemplary phone line interface system embodiment. When a user calls in to the system 100 using a telephone 302 they can either accept the predetermined audio delay or adjust the delay dynamically using one of several methods. The user 202 can enter the exact audio delay in seconds 304 that is noticed on the dial pad 208, for example five seconds and the system can adjust the delay by the requested amount. The user can dynamically increase or decrease the delay by a certain amount 306 using the dial pad 208. For example, the user can press one to increase the delay by one second, press two to decrease by one second, etc. Multiple combinations of keys relating to delays are possible, for example pressing two and then the pound key can increase the delay by one and a half seconds.

The user can select an audio channel to start a pre-delayed stream based on the video feed 308. When multiple video feeds are available, the system 100 can offer the user a list of choices. For example, the system can prompt the user, "If you are watching the game on Fox press 1, ESPN press 2, etc". Choosing an audio channel will start the audio stream with the predetermined delay corresponding to the video feed the user is watching. The user can adjust the delay as needed when the predetermined delay initially applied to the audio stream is incorrect. An advantage of offering the user a selection of video feeds to choose from, is that different broadcasts can have different audio delays. When the user specifies the video feed they are watching, a greater chance of providing an audio feed with a correct delay is possible, creating a pleasant viewing experience for the user.

Another way to adjust the audio delay via a telephone line is by entering a game clock time 310 for a game having a clock displaying a time such as a soccer game. The system can automatically compute the delay based on the entered game clock time and can adjust the audio stream accordingly. For example, the user can enter the game clock time of 15:12 for a soccer game into an application on his smartphone. Then the system can dynamically compute the audio delay of four seconds and provide the delayed audio to the user.

In one embodiment, the system can remember user preferences for subsequent calls 312. The system can maintain a database of users and their preferences by assigning each user with a unique caller identification. The system can store preferences and adjustments made by each user on previous calls. For subsequent calls, the system can automatically adjust a delay in audio based information stored in the database. For example, the system can store average delays for different video feeds such as ESPN and Fox and can deliver delayed audio based on the user's previous delays for each video feed.

Figure 4:
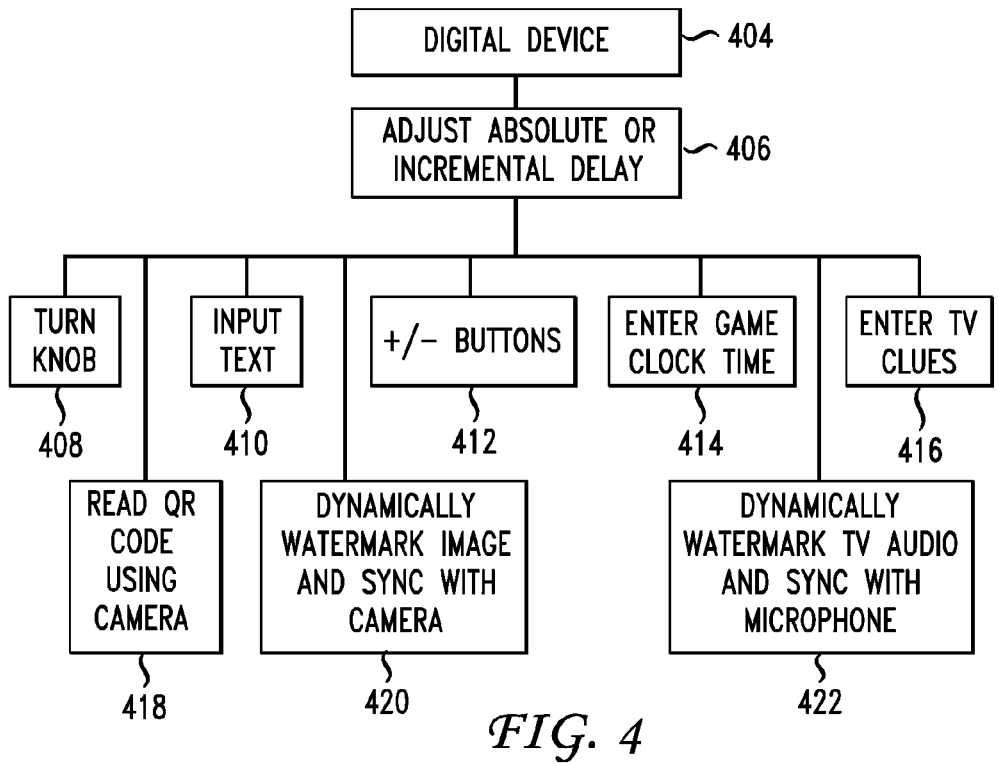
FIG. 4 illustrates an exemplary digital device interface system embodiment.

FIG. 4 illustrates an exemplary digital device interface system embodiment. When a user utilizes a digital device 404 such as a smartphone or tablet to interface with the system, the user can adjust an absolute or incremental delay 406 by manipulating controls within a dedicated application stored on the device. Controls such as turning a knob 408, inputting text 410, and using the plus and minus buttons 412 can be used to adjust the audio delay. Using an application clock that can be synchronized to a clock displayed on the television by turning a knob can give users a visual way to sync the audio and video streams.

The user can indicate the delay by entering a game clock time 414 for a game having a clock displaying a time such as a soccer match. The system can automatically compute the delay between the audio stream and the video stream, and can adjust the audio stream accordingly. The delay can be adjusted by entering television clues 416 such as text displayed on the television with instructions on synchronizing the audio stream. For example, text displayed in a corner on the television can read "Enter 1245 in the AudioNow app to sync". When the user enters the text, the audio is automatically synchronized with the video stream and delivered to the user via a user device.

The user can synchronize video and audio streams via a smartphone camera and/or microphone in several different ways. A system can display a dynamic quick response (QR) code 418 in a corner of the television that the user reads with the smartphone camera. The user can photograph the QR code using the camera, and the system can determine the delay between the audio stream and the video stream based on the dynamic QR code, and can adjust it accordingly. The QR code can update regularly; every second for example.

Another method of utilizing the smartphone camera to synchronize audio and video streams is for the system to dynamically watermark an entire image 420 or a partial image on the television. The user can use the smartphone camera to capture the watermark and the application can determine the delay between the audio and the video stream based on the image watermark. Then the system can synchronize the audio and video streams based on the determined delay.

A method of utilizing the smartphone microphone in synchronizing a video stream and an audio stream is for the system to dynamically watermark the television audio 422. An application on the smartphone can record the watermarked audio using the microphone and can determine the delay based on the watermark. Then the system can synchronize the audio and video streams based on the determined delay. Television audio watermarking can be beneficial for a user wanting to listen to a video presentation in another language, for example. It also can benefit a hearing impaired user. For a user wanting to listen to a video presentation in another language, the system can dynamically accept a language preference from an application on the smartphone or from the telephone and can synchronize the audio in the specified language with the video presentation displayed on the television. For example, when an audio stream in Spanish is selected and the original audio stream is in English, the system can automatically decrease the delay between the video stream and the Spanish audio stream because Spanish speakers often speak faster than English speakers. The user can dynamically change the language of the audio stream by interacting with the smartphone application or the telephone. For a user interacting with the system using a telephone, the system can deliver options such as, "Press 1 for English, press 2 for Spanish, press 3 for French, etc". For a hearing impaired user, the system can display streaming text across a smartphone screen, for example. The system can use the watermarked television audio to determine the delay between the streaming text and the video stream, and can synchronize the video stream and the textual dictation of the audio stream accordingly.

Figure 5:
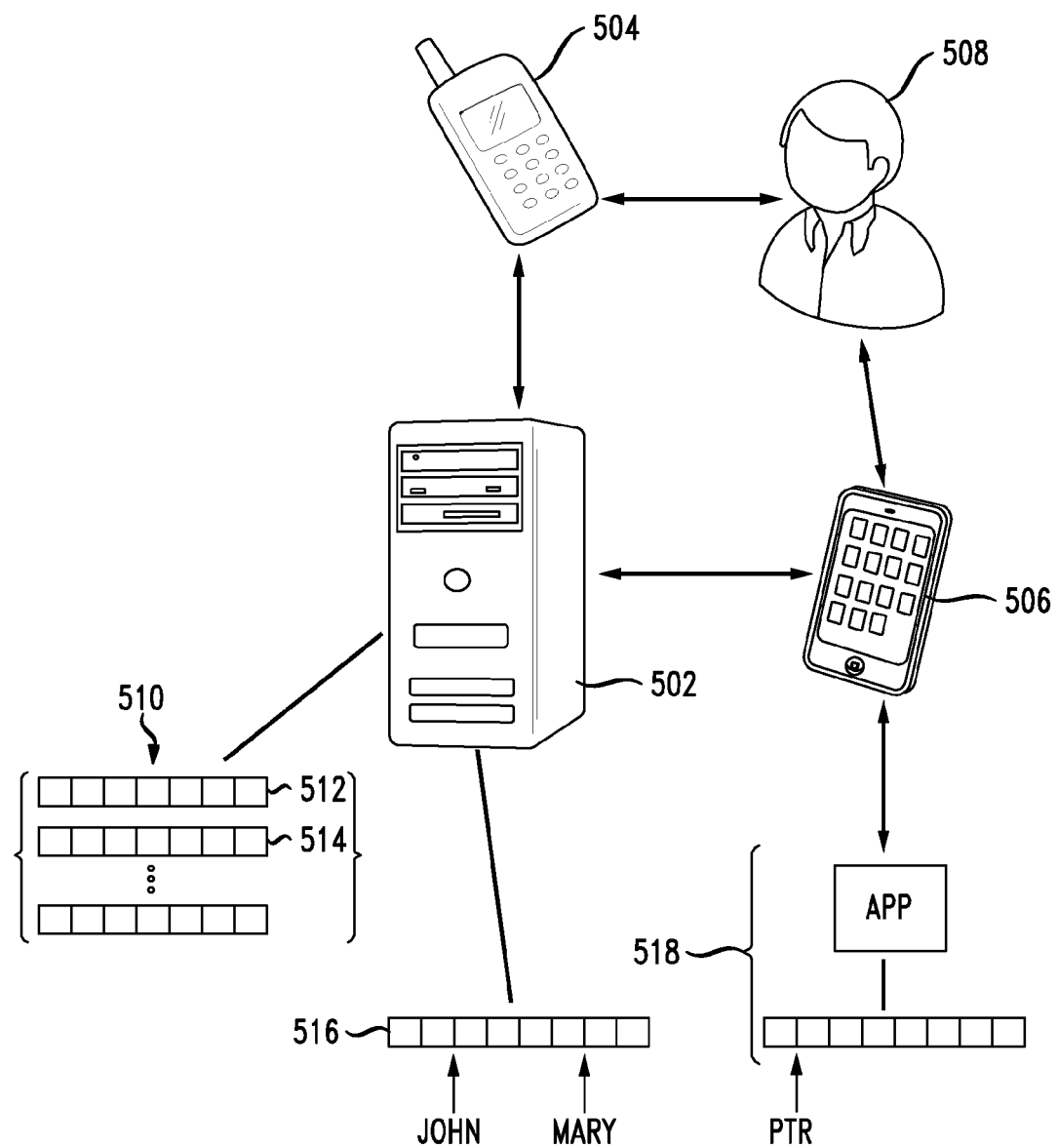
FIG. 5 illustrates an exemplary delayed stream implementation system embodiment.

FIG. 5 illustrates an exemplary delayed streams implementation system embodiment. A server 502 can accept requests for one or more audio streams via a telephone 504 and/or a digital device such as a smartphone 506 operated by a user 508 viewing a television broadcast. The server can store and maintain a set of audio stream buffers, each audio stream buffer in the set of audio stream buffers having a predetermined delay. They can run concurrently on the server and each can be delayed by one second, or fractions of a second 510, for example. For a range of delays between zero and thirty seconds with one second resolution, the server can run 31 streams. The first stream can have no delay 512, the second stream can be delayed by one second 514, etc. For a range of delays between zero and thirty seconds with a half second resolution, the server can run 61 streams. For example, the server can receive requests for audio associated with a video stream from John and Mary. John can input the delay of four seconds between his audio and video streams using a turn knob within an application on his smartphone. The server can use the buffer having a four second delay to stream the audio to John's smartphone. Mary can use the television clue "Enter 3212 to synchronize" within an application on her smartphone to adjust the delay. The application can determine a delay of two seconds and can send a request for an audio stream with the determined delay to the server. The server can use the buffer having a two second delay to stream the audio to Mary. In this way, the server can fulfill client requests for delayed audio streams using multiple buffers.

Alternately, the server 502 can maintain one buffer of a predetermined length of time 516, for example 30 seconds. When a user requests an audio stream with a certain time delay, a pointer into the audio buffer is calculated and the user is supplied audio data from the buffer starting at the calculated point. For example, John requests an audio stream with a delay of four seconds. The server computes the starting location 516 within the buffer having a delay of four seconds, and supplies the audio stream beginning with the starting location. Mary requests an audio stream with a delay of ten seconds. The server computes the starting location 516 within the buffer having a delay of ten seconds and supplies the audio stream from the starting location. An advantage of utilizing one buffer is that the buffer uses less memory; only pointers for each user are maintained in addition to the buffer itself.

In another embodiment, for digital device users only, an audio data buffer is kept on a digital device 518. The buffer pointer is calculated and maintained by the application on the device 506, not on the server. An advantage of storing the data buffer on the digital device is potentially a decreased lag time in audio stream delivery.

Figure 6:
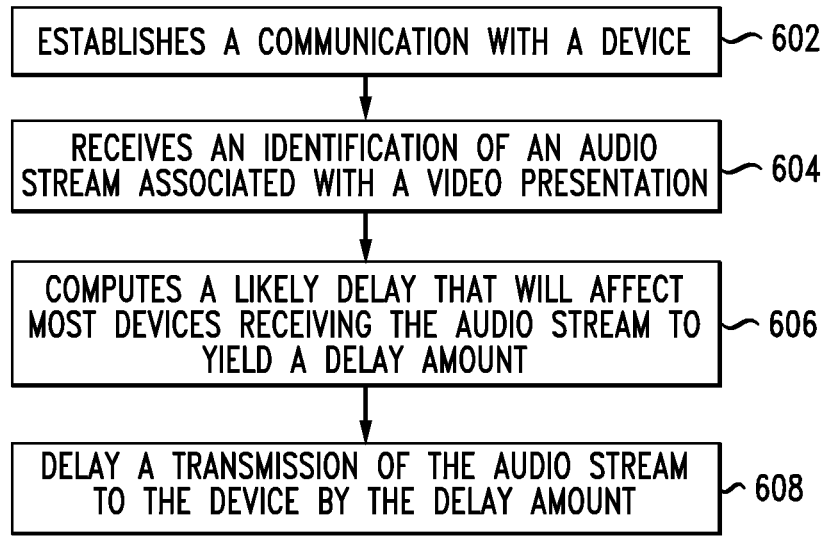
FIG. 6 illustrates an example synchronization method embodiment.

Having disclosed some basic system components and concepts, the disclosure now turns to the exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system establishes a communication with a device 602 such as a telephone, smartphone or tablet. Next, the system receives an identification of an audio stream associated with a video presentation 604. Then, the system computes a likely delay that will affect most devices receiving the audio stream to yield a delay amount 606. For example, a likely delay of seven seconds is computed that will affect most devices receiving the audio stream. Then the system delays a transmission of the audio stream to the device by the delay amount 608.

Figure 7:
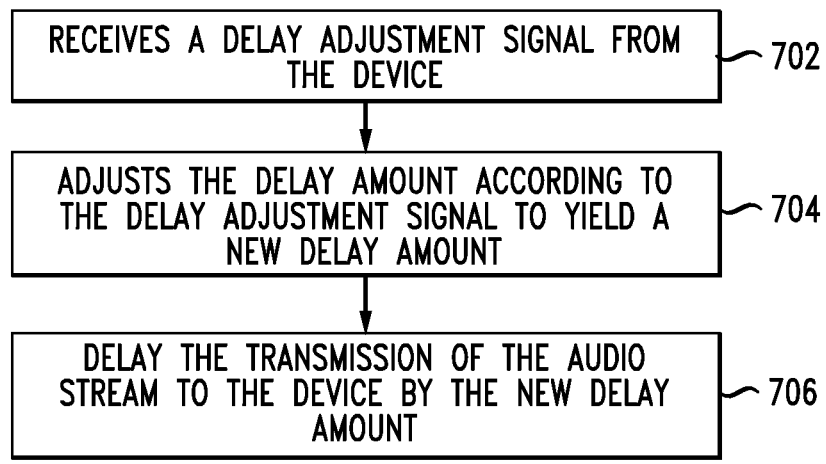
FIG. 7 illustrates an example synchronization method embodiment.

FIG. 7 illustrates an exemplary synchronization method embodiment. The system receives a delay adjustment signal from the device 702. The system adjusts the delay amount according to the delay adjustment signal to yield a new delay amount 704. Then, the system delays the transmission of the audio stream to the device by the new delay amount 706.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to streaming audio in different languages and can apply to hearing impaired users. Various modifications and changes may be made to the principles described herein without following the example embodiments and applications illustrated and described herein, and without departing from the spirit and scope of the disclosure.

We claim:

1. A method comprising:
    establishing a communication with a device;
    receiving an identification of an audio stream associated with a video presentation;
    computing a likely delay relative to the video presentation that will affect a plurality of devices receiving the audio stream to yield a delay amount;
    delaying a transmission of the audio stream to the device by the delay amount, wherein a user utilizes a dial pad on the device to perform one or more of inputting the new delay amount, increasing the new delay amount, decreasing the new delay amount and entering a game clock time;
    receiving a delay adjustment signal from the device;
    adjusting the delay amount according to the delay adjustment signal to yield a new delay amount; and
    delaying the transmission of the audio stream to the device by the new delay amount.

2. The method of claim 1. wherein the user inputs the new delay amount by manipulating controls within a dedicated application stored on the device.

3. The method of claim 2, further comprises receiving from the user input based on the user performing one or more of entering text, clicking on a digital device screen, turning a virtual knob, entering a game clock time, and entering television clues within the dedicated application.

4. The method of claim 2, wherein the user performs one or more of photographing a quick response code, photographing a watermarked television image and recording watermarked television audio.

5. The method of claim 2, wherein a server stores and maintains a set of audio stream buffers wherein each audio stream buffer in the set of audio stream buffers has a predetermined delay amount.

6. The method of claim 2, wherein a server stores and maintains one audio stream buffer having a set of pointers associated with the audio stream buffer.

7. The method of claim 3, wherein a digital device stores and maintains one audio stream buffer having a pointer associated with the audio stream buffer.

8. A system comprising:
    a processor; and
    a non-transitory computer-readable storage memory device storing instructions which, when executed by the processor, cause the processor to perform operations comprising:
        establishing a communication with a device;
        receiving an identification of an audio stream associated with a video presentation;
        computing a likely delay relative to the video presentation that will affect a plurality of devices receiving the audio stream to yield a delay amount;
        delaying a transmission of the audio stream to the device by the delay amount, wherein a user utilizes a dial pad on the device to perform one or more of inputting the new delay amount, increasing the new delay amount, decreasing the new delay amount and entering a game clock time;
        receiving a delay adjustment signal from the device;

adjusting the delay amount according to the delay adjustment signal to yield a new delay amount; and delaying the transmission of the audio stream to the device by the new delay amount.

9. The system of claim 8, wherein a user inputs the new delay amount by manipulating controls within a dedicated application stored on a digital device.

10. The system of claim 9, the computer-readable storage memory device further storing instructions which result in operations further comprising:

receiving data indicating that the user performed one or more of entering text, clicking on a digital device screen, turning a virtual knob, entering a game clock time, and entering television clues within the dedicated application.

11. The system of claim 10, the computer-readable storage memory device further storing instructions which result in operations further comprising:

receiving data indicating that the user performed one or more of photographing a quick response code, photographing a watermarked television image and recording watermarked television audio.

12. A non-transitory computer-readable storage memory device storing instructions which, when executed by a computing device, cause the computing device to perform operations comprising:

establishing a communication with a device;

receiving an identification of an audio stream associated with a video presentation;

computing a likely delay relative to the video presentation that will affect a plurality of devices receiving the audio stream to yield a delay amount;

delaying a transmission of the audio stream to the device by the delay amount, wherein a user utilizes a dial pad on the device to perform one or more of inputting the new delay amount, increasing the new delay amount, decreasing the new delay amount and entering a game clock time:

receiving a delay adjustment signal from the device;

adjusting the delay amount according to the delay adjustment signal to yield a new delay amount; and delaying the transmission of the audio stream to the device by the new delay amount.

13. The non-transitory computer-readable storage memory device of claim 12, wherein a server stores and maintains a set of audio stream buffers wherein each audio stream buffer in the set of audio stream buffers has a predetermined delay amount.

14. The non-transitory computer-readable storage memory device of claim 13, wherein a server stores and maintains one audio stream buffer having a set of pointers associated with the audio stream buffer.

15. The non-transitory computer-readable storage memory device of claim 13, wherein a digital device stores and maintains one audio stream buffer having a pointer associated with the audio stream buffer.

* * * * *